US012361251B2

(12) United States Patent
Balgañón Canela et al.

(10) Patent No.: US 12,361,251 B2
(45) Date of Patent: Jul. 15, 2025

(54) REGULATORY ENTITY REGISTRATION VERIFICATION AND AGE VERIFICATION SYSTEM FOR CONSUMER PRODUCTS

(71) Applicant: PACKAGING INNOVATION, S. DE R.L., Panamá (PA)

(72) Inventors: Pedro Balgañón Canela, Barcelona (ES); Frank Herrera, Tallahassee, FL (US)

(73) Assignee: PACKAGING INNOVATION, S. DE R.L., Panamá (PA)

( * ) Notice: Subject to any disclaimer, the term of this patent is extended or adjusted under 35 U.S.C. 154(b) by 565 days.

(21) Appl. No.: 17/857,683

(22) Filed: Jul. 5, 2022

(65) Prior Publication Data

US 2022/0335263 A1    Oct. 20, 2022

Related U.S. Application Data

(63) Continuation-in-part of application No. 17/350,606, filed on Jun. 17, 2021, which is a continuation-in-part of application No. 17/182,308, filed on Feb. 23, 2021, now Pat. No. 11,694,051, which is a continuation of
(Continued)

(51) Int. Cl.
*G06K 19/07* (2006.01)
*A24F 15/08* (2006.01)
*B65D 85/12* (2006.01)
*G06Q 30/0226* (2023.01)
*H04W 4/38* (2018.01)
(Continued)

(52) U.S. Cl.
CPC .......... *G06K 19/0723* (2013.01); *A24F 15/08* (2013.01); *B65D 85/12* (2013.01); *G06Q 30/0226* (2013.01); *H04W 4/38* (2018.02); *H04W 4/80* (2018.02); *H04W 12/50* (2021.01)

(58) Field of Classification Search
CPC ....... G06K 19/0723; H04W 4/38; H04W 4/80
USPC ....................................................... 235/492
See application file for complete search history.

(56) References Cited

U.S. PATENT DOCUMENTS

| 8,931,689 B2 | 1/2015 | Wang et al. |
| 9,536,404 B2 | 1/2017 | Glamuzina, Jr. |
| 10,387,695 B2 | 8/2019 | Engels et al. |

(Continued)

FOREIGN PATENT DOCUMENTS

| KR | 20130086905 A | 8/2013 |
| WO | 2020113900 A1 | 6/2020 |

*Primary Examiner* — Allyson N Trail
(74) *Attorney, Agent, or Firm* — Mark Terry

(57) ABSTRACT

A method for confirming regulatory entity registration of a consumer product and verifying age of a user of the consumer product includes coupling a radio frequency tag to the consumer product, storing in a database a record for each of a plurality of consumer products, and a record for each of a plurality of consumers, executing an application on a computing device for reading identifying data from the radio frequency tag and transmitting said data to a server that accesses a record in the database that corresponds to the product and transmitting a confirmation of regulatory entity registration of the consumer product to the application, wherein the application further reads user identification data and transmits it to the server which calculates an age of the user based on the user identification data, and if the age of the user is above a predefined age, then storing the user identification data.

14 Claims, 13 Drawing Sheets

Related U.S. Application Data application No. 17/088,687, filed on Nov. 4, 2020, now Pat. No. 10,929,738.

(60) Provisional application No. 63/018,577, filed on May 1, 2020.

(51) Int. Cl.
  *H04W 4/80* (2018.01)
  *H04W 12/50* (2021.01)

(56) References Cited

U.S. PATENT DOCUMENTS

| | | |
|---|---|---|
| 10,474,945 B2 | 11/2019 | McDonald et al. |
| 10,640,273 B2 | 5/2020 | Camenisch et al. |
| 10,929,738 B1 | 2/2021 | Balganon et al. |
| 2006/0224449 A1* | 10/2006 | Byerley ............ G06Q 30/0226 705/14.27 |
| 2009/0219132 A1 | 9/2009 | Maytal et al. |
| 2015/0106283 A1 | 4/2015 | Lee et al. |
| 2017/0032382 A1 | 2/2017 | Shulman et al. |
| 2017/0193429 A1* | 7/2017 | Olson .................. G06Q 10/087 |
| 2017/0316477 A1 | 11/2017 | Prasad |
| 2021/0011446 A1 | 1/2021 | Anderson et al. |
| 2021/0012400 A1 | 1/2021 | Locke et al. |
| 2021/0145076 A1 | 5/2021 | Barbaric et al. |
| 2021/0248439 A1 | 8/2021 | Isabell et al. |
| 2021/0287484 A1 | 9/2021 | Amaitis et al. |
| 2021/0312033 A1 | 10/2021 | Kirkeby |
| 2021/0326905 A1 | 10/2021 | McKinnon |
| 2021/0350374 A1 | 11/2021 | Keen |
| 2023/0322487 A1* | 10/2023 | Patel .................... G06K 7/1413 700/206 |
| 2024/0095718 A1* | 3/2024 | McDaniel .............. G07G 1/009 |
| 2024/0202725 A1* | 6/2024 | Anapliotis ......... G06Q 30/0607 |
| 2024/0249102 A1* | 7/2024 | Balgañón Canela . H04W 12/50 |
| 2025/0005604 A1* | 1/2025 | Budano .............. G06K 7/10415 |

* cited by examiner

REGULATORY ENTITY REGISTRATION VERIFICATION AND AGE VERIFICATION SYSTEM FOR CONSUMER PRODUCTS

CROSS-REFERENCE TO RELATED APPLICATIONS

This patent application is a continuation in part of, and claims priority to, patent application Ser. No. 17/350,606 filed Jun. 17, 2021, which is a continuation in part of, and claims priority to, patent application Ser. No. 17/182,308 filed Feb. 23, 2021, which is a continuation of, and claims priority to, patent application Ser. No. 17/088,687 filed Nov. 4, 2020, which claims priority to provisional patent application 63/018,577 filed May 1, 2020. The subject matter of patent application Ser. Nos. 17/350,606, 17/182,308, 17/088,687 and 63/018,577 are hereby incorporated by reference in their entirety.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The claimed embodiments relate to the field of consumer safety and more specifically to the field of verifying a consumer product has been registered with a regulatory entity and verifying the age of a consumer.

BACKGROUND

Certain regulatory entities, such as the Food and Drug Administration in the United States, are tasked with protecting and promoting public health through the control and supervision of a variety of consumer products, such as food, tobacco products, dietary supplements, prescription and over-the-counter drugs, vaccines, biopharmaceuticals, blood transfusions, medical devices, cosmetics, etc. Said regulatory entities have set processes for listing, registering, approving, reviewing or otherwise processing the consumer products that it regulates for the purpose of promoting public health. But there currently is no quick and easy way for consumers, regulatory authorities, manufacturers, distributors, etc. to check that a consumer product has been listed, registered, compliant or otherwise processed by said regulatory entities.

While there are methods of authenticating a consumer product, they tend to only provide confirmation of the product's source and intended nature, quality, or presentation. They are less successful in conveying whether a consumer product has been registered with a regulatory entity, and other information that the consumer may find important or beneficial.

Another shortfall associated with current methods of doing commerce online is the lack of the ability to properly verify the age of a consumer before purchase or before use of the product. Some products, such as smoking articles, tobacco, and liquor, require a minimum age of the consumer in order to legally purchase the product. Minimum age requirements may differ by country and/or jurisdiction and may vary according to the type of product. Today, there is no automated and accurate way to verify the age of a consumer before purchase or use of a product, in order to ensure that the consumer can legally purchase and consume the product.

Due to the shortfalls of the currently existing methods and systems of product registration verification and age verification, a need exists for a system and method for users to quickly and easily verify that a product they have purchased or are looking to purchase has been registered with a regulatory entity, as well as verify the age of the consumer in order to ensure the consumer can legally purchase and consume the product. Specifically, a need exists for a centralized system and method of product registration verification, product related content delivery and consumer age verification.

SUMMARY

A method and system for confirming regulatory entity registration of a consumer product and verifying age of a user of the consumer product is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claim subject matter's scope.

In one embodiment, the method includes coupling a radio frequency tag to the consumer product wherein said tag is programmed to provide the following identifying data to a mobile computing device when said tag is scanned: a unique product identifier, and an encrypted packet comprising a hash that uniquely identifies said tag, storing in a database, communicatively coupled to a communications network, a record for each of a plurality of consumer products, wherein each record includes: a unique product identifier, and a hash algorithm, storing in a database, communicatively coupled to a communications network, a record for each of a plurality of consumers, wherein each record includes: a unique consumer identifier, and a date of birth, executing an application on a computing device communicatively coupled to the communications network, wherein said application is configured for reading identifying data from the radio frequency tag and transmitting said identifying data to a server via the communications network, wherein the server is configured for: i) receiving the identifying data from the application, ii) accessing a first record in the database that corresponds to the unique product identifier in the identifying data, comparing the hash in the identifying data to a hash algorithm in the first record; and if the hash in the identifying data matches the hash algorithm in the first record, then transmitting, over the communications network, a confirmation of regulatory entity registration or compliance of the consumer product to the application, wherein said application is further configured for reading user identification data from the user and transmitting said user identification data to the server via the communications network, wherein the server is further configured for: i) receiving said user identification data from the application, ii) calculating an age of the user based on the user identification data, and iii) if the age of the user is above a predefined age, then accessing a second record in the database that corresponds to the user, and storing the user identification data in the second record, and a pointer to the first record.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
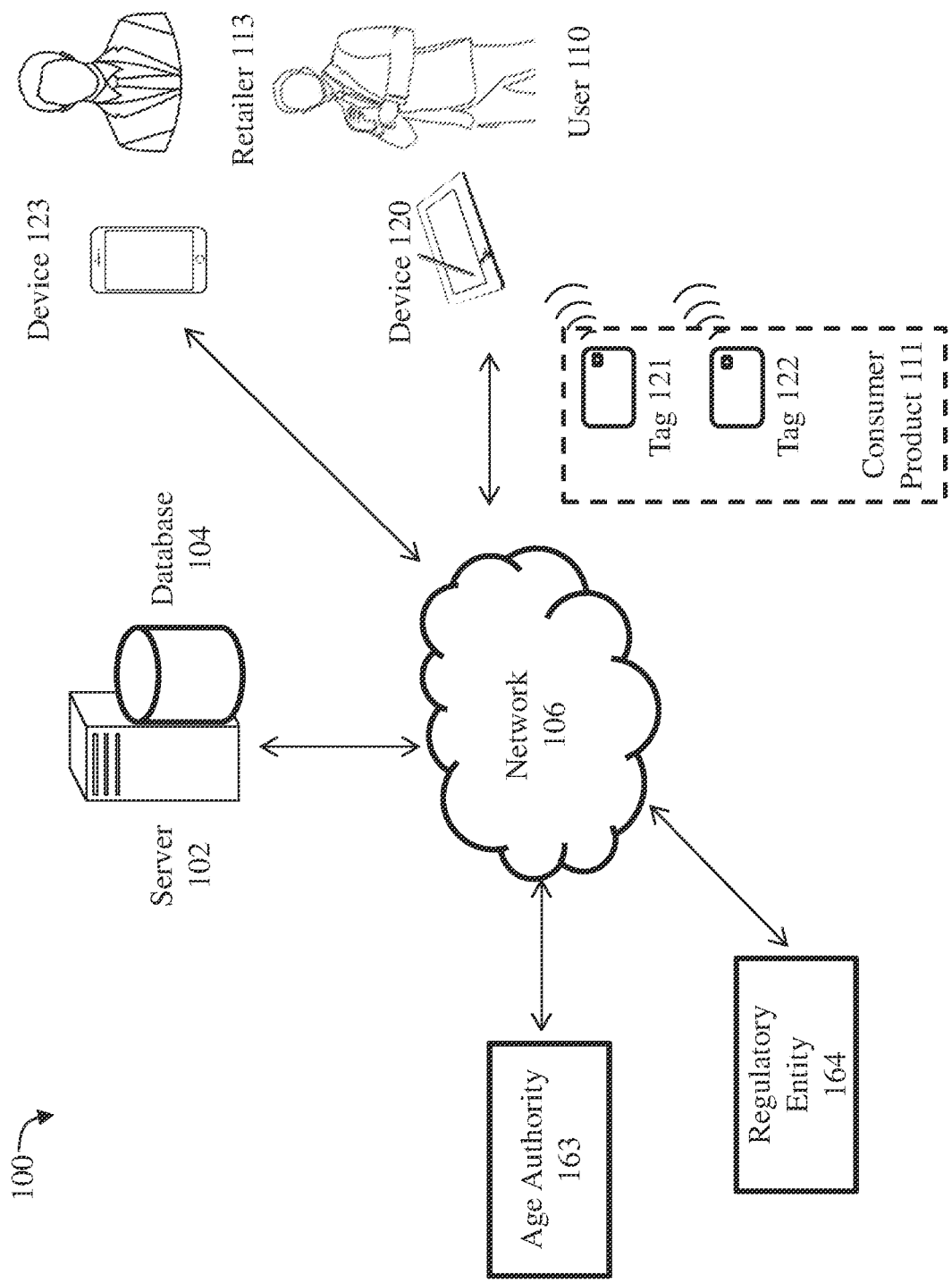
FIG. 1 is a block diagram of an operating environment that supports a process for facilitating regulatory entity registration verification of consumer products, as well as age verification, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a simple, cost-effective, and user-friendly method for verifying regulatory entity registration or compliance of consumer products and providing end-users with relevant product and commercial content, as well as verifying the age of consumers. The claimed subject matter reduces or eliminates the risk of purchasing or selling products that aren't registered with a regulatory entity since it quickly and conveniently provides a user with information regarding the regulatory entity registration status of the product at question, provides information about its use, source, and other relevant information. Also, the claimed subject matter reduces the amount of time and money a consumer or business may spend inspecting products for verifying regulatory entity registration of a product by eliminating the need for manual inspection and verification. In addition, the claimed subject matter helps the consumer access information about their product including warranty information, exclusive commercial content, interactive content, and other content relevant to the product and consumer. Therefore, the claimed subject matter reduces or eliminates the burden placed on consumers, vendors, and manufacturers looking to verify or convey the regulatory entity registration status of a consumer product. The claimed subject matter also reduces or eliminates the amount of time spent by consumers reviewing a consumer product online before purchase. The claimed subject matter further improves over the prior art by providing an efficient, and user-friendly method for verifying a consumer's age so as to ensure that the user is of age to purchase and/or consumer a product.

FIG. 1 is a block diagram of an operating environment 100 that supports a method and system for verifying regulatory entity registration of a consumer product on a server communicatively coupled with a communications network 106, as well as consumer age verification. The server 102 and devices 120, 123 may be communicatively coupled with a communications network 106, according to an example embodiment. The environment 100 may comprise mobile computing devices 120, 123 which may communicate with server 102 via a communications network 106. Mobile computing devices 120, 123 may comprise a cellular/mobile telephone, smart phone, tablet computer, laptop computer, handheld computer, desktop computer, wearable computer, or the like. The mobile computing devices 120, 123 may be connected either wirelessly or in a wired or fiber optic form to the communications network 106. Communications network 106 may be a packet switched network, such as the Internet. or any local area network, wide area network, enterprise private network, cellular network, phone network, mobile communications network, or any combination of the above.

FIG. 1 also shows an identification device or tag 121 placed on, in, or around consumer product 111. Tag 121 may be a near field communication (NFC) tag that emits radio frequency signals that comport with the ISO/IEC 18092 and ECMA 340 communications protocol standards. Tag 121 may also include encryption and authentication standards such as those described in ISO/IEC 18000, 29167 and ISO/IEC 20248. The tag 121 may also store additional data about a consumer product, such as any of the data in the consumer product's record, described in further detail below. In generally, the tag 121 may be any radio frequency device that is configured to transmit a radio frequency signal that is readable over short distances. The tag 121 may also be configured for attachment to product packaging in such a way that the tag is able to detect if the product packaging has been opened. For example, one or more conductive terminals may be disposed on the surface of the tag and the surface of the tag may be applied (such as by adhesive) to the product packaging along a rip line or other line in which the product must be opened. When the product packaging is opened, the one or more conductive terminals are no longer conductively coupled, which may be detected by the tag. The tag 121 may also include temperature and humidity data and be configured to keep a log of temperature and humidity data regarding shipment and storage of the consumer product to which it is affixed.

FIG. 1 also shows an identification device or tag 122 placed on, in, or around consumer product 111. Tag 122 may be a radio frequency identification (RFID) tag that emits radio frequency signals that comport with RFID communications protocol standards, such as ISO/IEC 14443, 1569318000, 1809218185, 21481, ASTM D7434, D7435, D7580. Tag 122 also store additional data about a consumer product, such as any of the data in the consumer product's record, described in further detail below. In generally, the tag 122 may be any radio frequency device that is configured to transmit a radio frequency signal that is readable over short distances. The tag 122 may also be configured for attachment to product packaging in such a way that the tag is able to detect if the product packaging has been opened, as described above. The tag 122 may also include temperature and humidity data and be configured to keep a log of temperature and humidity data regarding shipment and storage of the consumer product to which it is affixed. In one embodiment, tag 121 and/or tag 122 is placed on, in, or around the product 111.

The environment 100 shows that device 120 is operated by a user 110, which may be a consumer. The term "consumer" is used to refer to a person, an end-user of the consumer product 111, an intermediate user of the consumer product, or the like. The environment 100 shows that device 123 is operated by a retailer 113, which may be a seller of the consumer product. The term "retailer" is used to refer to a person, a retailer of the consumer product, a distributor of the consumer product, an intermediate holder, importer, transporter or a distributor of the consumer product, or the like. Server 102, tags 121, 122 and devices 120, 123 may each comprise a computing device 600, described below in greater detail with respect to FIG. 6.

In another embodiment, the devices 120, 123 may also calculate current geographical position (otherwise referred to as geographical location data) using a sub-system, an on-board processor, or a connected processor. In one embodiment, the devices 120, 123 may calculate current position using a satellite or ground-based positioning system, such as a Global Positioning System (GPS) system, which is a navigation device that receives satellite or land-based signals for the purpose of determining the device's current geographical position on Earth. Generally, devices 120, 123 calculates global navigation satellite system (GNSS) data. A GNSS or GPS receiver, and its accompanying processor, may calculate latitude, longitude, and altitude information. In this document, the terms GNSS and GPS are used generally to refer to any global navigation satellite system, such as GLONASS. GALILEO. GPS, etc. In this embodiment, a radio frequency signal is received from a satellite or ground-based transmitter comprising a time the signal was transmitted and a position of the transmitter. Subsequently, the devices 120, 123 calculate current geographical location data of the device based on the signal. In another embodiment, the devices 120, 123 calculate current geographical location using alternative services, such as control plan locating, GSM localization, dead reckoning, or any combination of the aforementioned position services. The term spatial technologies or spatial processes refers generally to any processes and systems for determining one's position using radio signals received from various sources, including satellite sources, land-based sources, and the like.

Computing device 102 includes a software engine that delivers applications, data, program code and other information to networked devices, such as device 120. The software engine of device 102 may perform other processes such as transferring multimedia data in a stream of packets that are interpreted and rendered by a software application as the packets arrive. FIG. 1 further shows that device 102 includes a database or repository 104, which may be a relational database comprising a Structured Query Language (SQL) database stored in a SQL server. Mobile computing device 120 may also include its own database, either locally or via the cloud. The database 104 may serve user identifying data, as well as related information from a product's corresponding product record (located in database 104), which may be used by device 102 and mobile computing devices 120, 123.

Device 102, mobile computing devices 120, 123 and tags 121, 122 may each include program logic comprising computer source code, scripting language code or interpreted language code that perform various functions of the disclosed embodiments. In one embodiment, the aforementioned program logic may comprise program module 606 in FIG. 6. It should be noted that although FIG. 1 shows only two mobile computing devices 120, 123, two tags 121, 122 and one server 102, the system of the disclosed embodiments supports any number of servers, tags and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

The database 104 may include a consumer product record for each individual consumer product 111. A consumer product record may include: the consumer product name, a consumer product identifier (which may be unique), information about the authenticity of the consumer product, consumer product packaging information, exclusive commercial content relating to the consumer product, pairings relating to the consumer product, instructions for use related to the consumer product, warranty information, rewards or benefits related to the consumer product, interactive content, augmented reality media, information regarding upcoming events related to the brand of the consumer product, information regarding integration with social networks, redirect links to the vendor or manufacturer's website, nearby events relating to the consumer product, etc. A consumer product record may further include a unique code, such as a UPC code or a QR code, corresponding to the consumer product. A consumer product record may further include information about how and whether a product has passed regulatory entity registration or has been deemed compliant with regulatory entity registration.

A consumer product record may also include a unique identifier for a product. A unique identifier is an identifier that is registered to a specific unit of the consumer product. Unique identifiers avoid shortcomings that are associated with the use of product identifiers alone, giving each unit of the consumer product its own identifier to facilitate in the recognition and verification of authenticity of the consumer product. A consumer product record may also include a hash algorithm, which is an algorithm or hash function that maps data of arbitrary size to fixed-size values. The value returned by a hash algorithm is a hash or hash value. A tag may produce a unique hash that is distinctive and exclusive for the particular interaction. This hash is included as a query string parameter in a URL including a unique identified and counter mirroring (explained in greater detail below). A consumer product record may also include a data value indicating whether said consumer product is regulated by a governmental authority and/or has passed or is otherwise compliant with regulatory review by a governmental authority.

A consumer product record may also include a three-dimensional (3D) model of the corresponding consumer product, which is represented by a 3D file. A 3D model is a virtual representation of a real object, such as a bottle of wine or a cigar. A 3D model is a mathematical representation of the physical object in three dimensions using a collection of points in 3D space, connected by various geometric entities such as triangles, lines, curved surfaces, etc. A 3D model may be displayed as a two-dimensional image on a display screen through a process called 3D rendering. The set of actions that may be performed on the 3D model include viewing the 3D model in two dimensions (3D rendering), rotating the 3D model, resizing the 3D model, manipulating the 3D model, changing the color or other characteristics of the 3D model, changing the viewer's perspective in relation to the 3D model, etc. The set of actions may include interactive manipulation of the 3D model via a display screen on a client computing device, such as those defined above. The set of actions that may be performed on the 3D model may be performed by the device of the user, which may be a virtual reality or augmented reality system.

The set of actions that may be performed on the 3D model may also include engaging in an action that involves the 3D model, such as unboxing the 3D model, viewing the 3D model in an environment that represents the store in which the consumer product is sold, or viewing the 3D model in a location related to the consumer product, such as the winery associated with a bottle of wine that comprises the consumer product. In another embodiment, the set of actions that may be performed on the 3D model may also include the user being surrounded by a completely different environment when viewing through their device—perhaps being within a vineyard in the case of the consumer product being a wine bottle. The set of actions that may be performed on the 3D model may be performed by the virtual reality or augmented reality system of the user's device.

The 3D model or 3D file in a product record that corresponds to the consumer product 111 may comprise a model of the consumer product itself. Alternatively, the 3D model or 3D file in the product record may comprise other aspects related to the consumer product 111, such as a logo of the company that makes the consumer product, a geographical region related to the consumer product, a place or building related to the consumer product, a manufacturing plant or factory related to the consumer product, an event related to the consumer product, an activity related to the consumer product, a process an event related to the consumer product, a manufacturing or building activity related to the consumer product, a byproduct related to the consumer product, an ingredient related to the consumer product, a store or retailer related to the consumer product, consumers related to the consumer product, etc.

FIG. 1 also shows an age authority 163 coupled with network 106. The age authority 163 may comprise one or more entities, such as one or more governmental entities, which includes a database from which a consumers age may be calculated. For example, the age authority may comprise a database of consumer identifying information that includes ages and dates of birth. Said database may include a consumer record for each consumer wherein each record includes either an age for a consumer or a date of birth for each consumer. Said database may be checked to determine whether or not a consumer has an age that is at or above a predefined threshold, wherein said predefined threshold is a governmental requirement for purchasing and/or consuming a particular consumer product.

FIG. 1 also shows a regulatory entity 164 coupled with network 106. The regulatory entity 164 may comprise one or more entities, such as one or more governmental entities, which includes a database from which it may be determined if a consumer product has been listed, registered, approved, deemed compliant, reviewed or otherwise processed in any way for the purpose of promoting public health. For example, the age authority may comprise a database of consumer products that have been listed, registered deemed compliant, or approved. Said database may include a consumer product record for each consumer product wherein each record includes a unique identifier, a description and an indicator of whether the consumer product has been listed, deemed compliant, registered or approved. Said database may be checked to determine whether or not a consumer product has been listed, deemed compliant, registered or approved. In this document, the phrase "confirming regulatory entity registration" refers generally to the task of confirming that a consumer product has been listed, registered, approved, deemed compliant, reviewed or otherwise processed in any way for the purpose of promoting public health by a regulatory entity or authority.

Figure 2A:
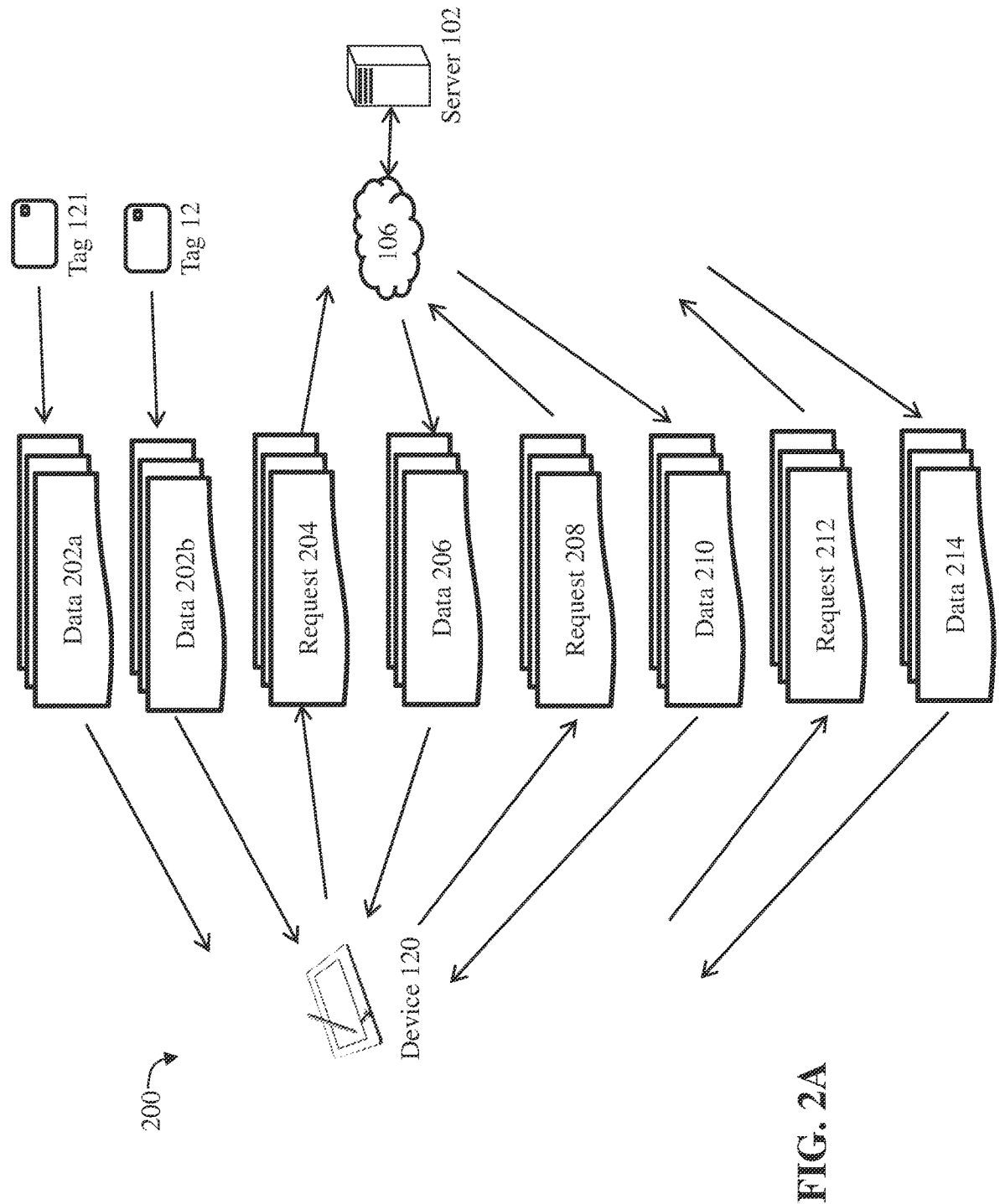
FIG. 2A is a diagram showing the data flow of the process for facilitating the regulatory entity registration verification of, and interaction with, a variety of consumer products, according to an example embodiment.
Figure 3A:
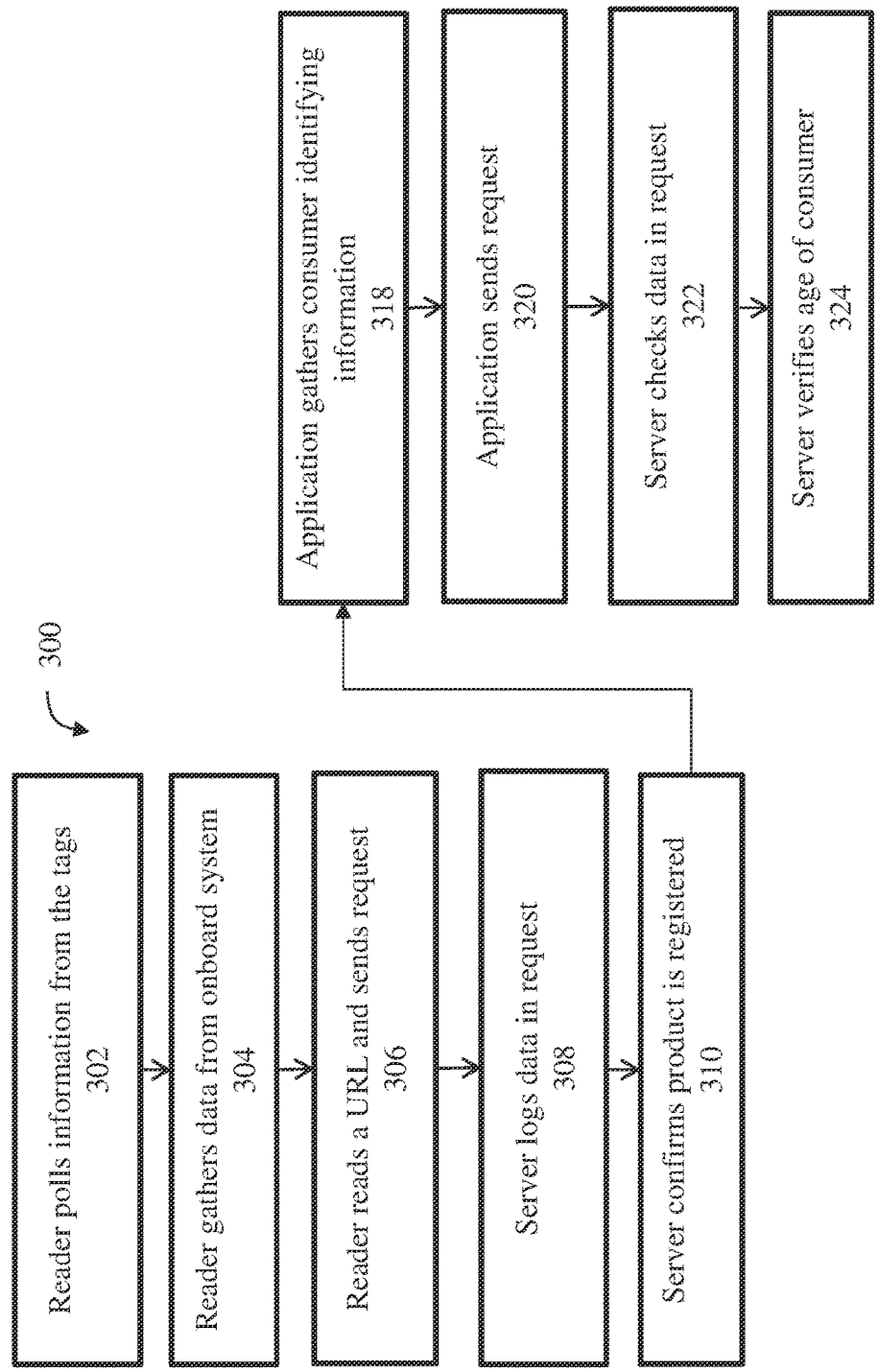
FIG. 3A is a flow chart of a method for identifying a product for regulatory entity registration verification and returning the related results to the reader, according to an example embodiment.
Figure 5A:
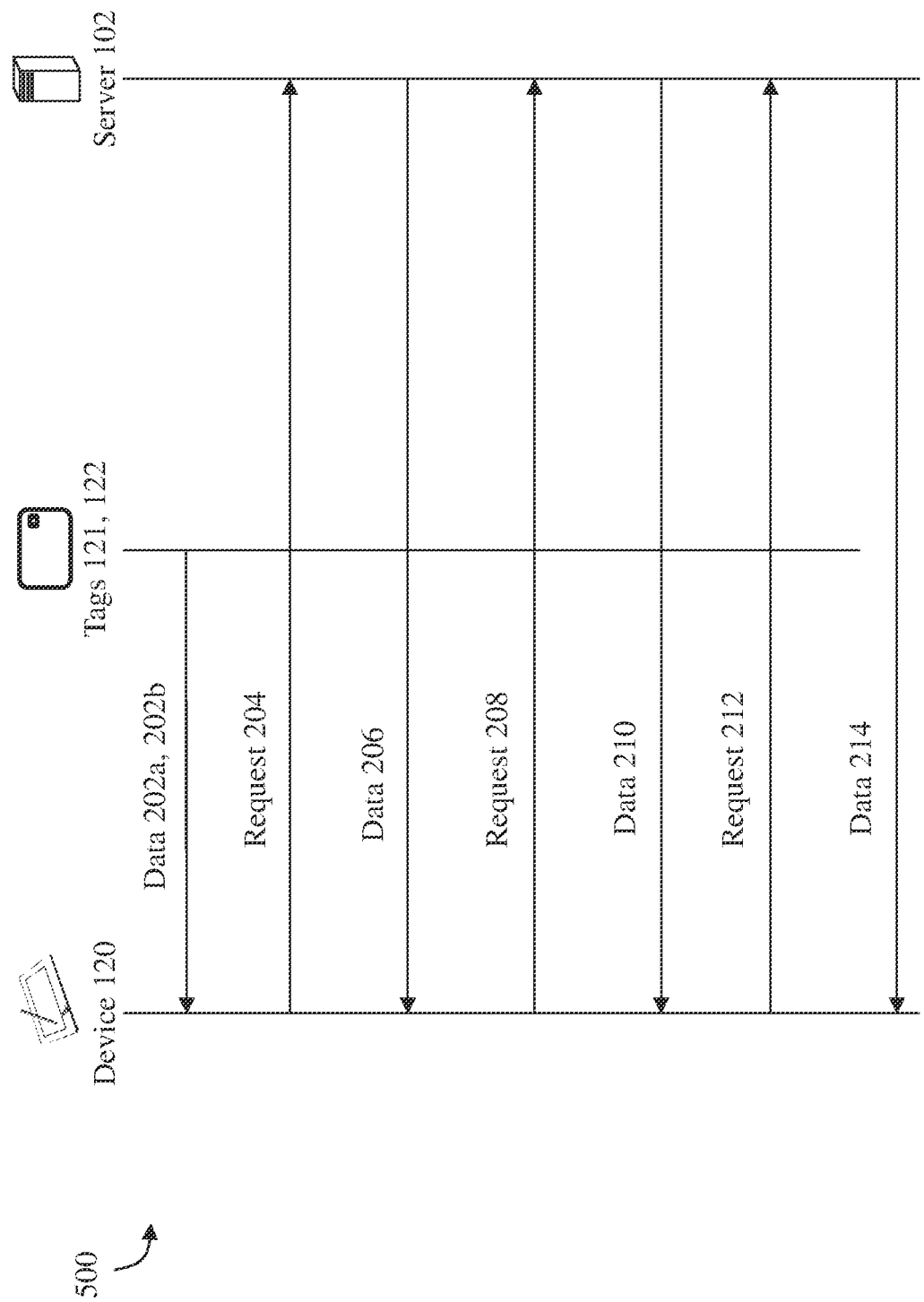
FIG. 5A is a diagram showing the interaction between a tag on a consumer product, a consumer or regulatory employee mobile device, and a server during the process of regulatory entity registration verification of, and interaction with, a variety of consumer products, according to an example embodiment.

The method and system for verifying the regulatory entity registration status of a consumer product and verifying age is described in more detail below, with reference to FIGS. 2A, 3A and 5A. FIG. 2A is a diagram showing the data flow 200 of the process for facilitating the verification of regulatory entity registration status of consumer products, as well as consumer age verification. FIG. 3A is a flow chart 300 of a method for identifying a product for regulatory entity registration status verification and returning the related results to the reader, and FIG. 5A is a diagram 500 showing the interaction between a tag on a consumer product, a consumer or regulatory entity employee mobile device, and a server during the process of verifying regulatory entity registration status of a variety of consumer products and age verification.

Figure 4:
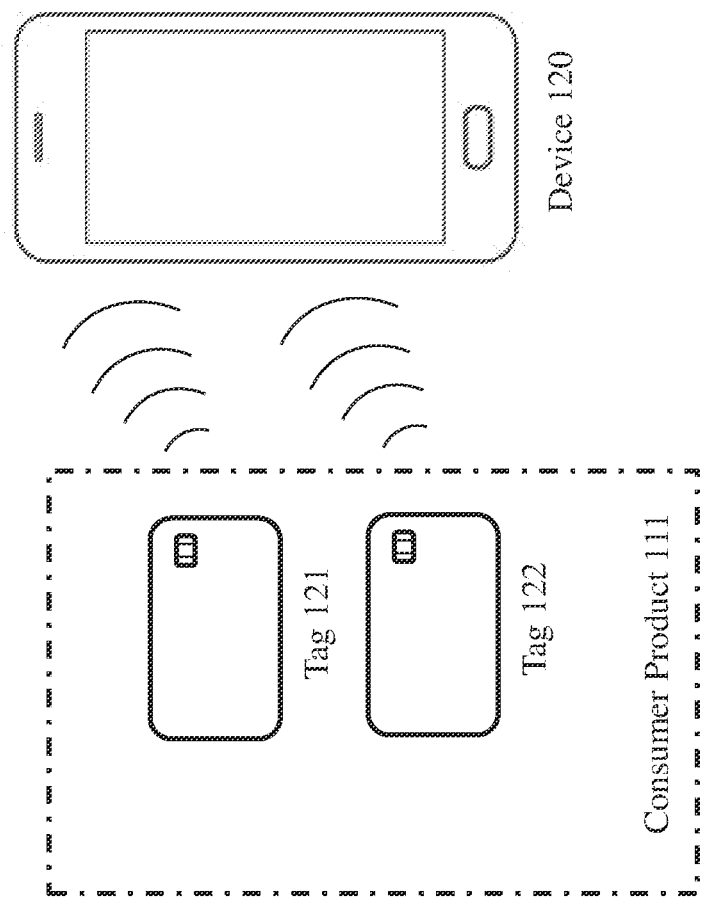
FIG. 4 is a drawing depicting the process of transmitting data from tags on a consumer product to a consumer mobile device, according to an example embodiment.

The process of verifying regulatory entity registration or compliance status of a consumer product 111 and age verification begins with step 302 of FIG. 3A. In step 302, the reader on mobile device 120 or 123 polls information 202a from the tag 121 and information 202b from tag 122. For reference, and only as an example. FIG. 4 shows the tags placed in close proximity to the mobile device 120 (also be referred to herein as "reader") to initiate the process of FIG. 3A. This process is initiated by the user 110 (or retailer 113) by either tapping or scanning the tags, depending on which type of tags have been placed on the consumer product 111 or its packaging.

In step 302, in one option, some or all of the data 202a, 202b read by device 120 or 123 is displayed on device 120 or 123. Data 202a and data 202b may each include, for example, the consumer product name, a product identifier, a unique identifier, a product description, warranty information, and/or a photo of the product. In another embodiment, data 202a and data 202b may each include a hash that is produced by the tag wherein encoded in said hash is the unique identifier that identifies the tag itself. The hash may be referred to as an encrypted packet that includes the unique identifier that identifies the tag itself. The data 202a and data 202b may each include a counter, which is a numerical value that represents how many times the tag has been scanned to provide data, and which is increased sequentially each time the tag is tapped. The data 202a and data 202b may each optionally include a URL that includes both the unique identifier that identifies the tag itself and the counter as parameters in the URL. The data 202a and data 202b may each include a value that indicates whether the product packaging has been opened yet. The data 202a and data 202b may each include any data that the tag is capable of storing. The data 202a and data 202b may each include a URL containing an encrypted packet comprising a hash that uniquely identifies said tag. The data 202a may be referred to as first identifying data, and the data 202b may be referred to as second identifying data. Alternatively, the data 202a and data 202b may each include the encrypted packet comprising a hash that uniquely identifies said tag.

In one embodiment, in step 302, the application on the computing device is further configured for reading data from the radio frequency tag if said radio frequency tag provides an encrypted data packet to said application, wherein said application contains a key for unencrypting said data packet.

In step 304, the reader on the device 120 or 123 gathers data 202a, 202b (also see FIGS. 2A and 5A) from the onboard system, and in step 306 the reader generates a URL (copied from data 202a, and/or data 202b), and sends a request 204 (such as an HTTP request) via the network 106 to the server 102 including said URL. The data sent in request 204 may include the product identifier and unique identifier which the server will use to process the request, authenticate the consumer product, and return the relevant information. This will be explained in further detail below in steps 308-316. The data sent to the server may also include the hash described above, the unique identifier that identifies the tag itself and the counter as parameters in the URL. In one alterative to steps 304, 306, the reader on the device 120 or 123 gathers data 202a. 202b and sends the data collected, including the encrypted packet comprising a hash that uniquely identifies said tag, to the server 102.

Next, in step 308, the server processes and logs the data from the request 204 sent in step 306. The product identifier and unique identifier sent in the request are used in this step by the server to identify the correct product record in database 104 and compare the data 204 to the data in the correct product record.

Once the server has logged the data, the regulatory entity registration or compliance status of the product is verified in step 310 using the unique identifier. In step 310, the server may use mirroring processes and reading counter processes to verify the regulatory entity registration or compliance status of the product. Mirroring processes are replica processes for services accessible through the communications protocol, wherein identical or near-identical authentication processes are executed.

In one embodiment, in step 310, the server 102 may compare any of the data 204 (that was sent to the server) to data located in the product record (in database 104) that corresponds to the product identifier in the data 204. If any of the data does not match, then there is a denial of confirmation of regulatory entity registration or compliance. If all said data matches, then there is a confirmation of regulatory entity registration or compliance that occurs. In one embodiment, the server 102 may also compare the counter value in data 204 to a running counter value located in the product record that corresponds to the product identifier in the data 204. If the counter value does not match, then there is a denial. If the counter value matches, then there is a validation that occurs. In another embodiment, the server 102 may also compare the hash in data 204 to the result of a hash algorithm located in the product record that corresponds to the product identifier in the data 204. If the values do not match, then there is a denial of. If the values match, then there is a validation.

Optionally, in step 310, the server 102 may read the data value in the product record that indicates whether said consumer product has passed regulatory entity registration or compliance and if said data value indicates that said consumer product has passed regulatory entity registration or compliance by the governmental authority, then the server may send a message to the mobile application indicating that said consumer product has passed or is otherwise compliance with regulatory entity registration by the governmental authority.

In step 318, the mobile application in device 120 collects identifying data about the consumer such as a unique identifier (social security number or the like), name, age, birthdate, address, driver's license, email, etc. In step 320, the mobile application in device 120 send a request 212 to the server 102 via network 106 to verify the consumer's age. In step 322, the server 102 receives the identifying data, and transmits a request to verify the age of the consumer to the age authority 163 via network 106. In step 324, the server receives a response from the age authority 163 via network 106 regarding whether the consumer's age is in fact above a predefined threshold, according to the records of the age authority. Said response may be a simple message stating that the user's age is or is not verified. If the age authority 163 has determined that the consumer's age is in fact above a predefined threshold, then the server 102 sends a verification message 214 of the consumer's age to the user's device 120 via network 106.

In one alternative to steps 318-324, the mobile application in device 120 is configured for reading an identification (such as a driver's license, passport, etc.) for the user of the consumer product, detecting date of birth data for the user in the identification, calculating an age for the user based on the date of birth data, and if the age of the user is above a predefined threshold age, then displaying an approval of age verification. The identification may be read by imaging or taking a photograph of the identification using a camera or uploading an electronic form of the identification. Detecting date of birth data for the user in the identification may be accomplished using optical character recognition or the like. The image or photograph of the user's identification may be stored in the user record for the user.

In another alternative to steps 318-324, the mobile application in device 120 is configured for reading a unique machine-readable identifier or code (such as a QR code) associated with the user of the consumer product. The mobile application in device 120 sends a request 212 to the server 102 via network 106 to verify the consumer's age using the unique identifier or code to identify the user. The server 102 receives the unique code data and transmits a request to verify the age of the consumer to the age authority 163 via network 106. The server receives a response from the age authority 163 via network 106 regarding whether the consumer's age is in fact above a predefined threshold, according to the records of the age authority. Said response may be a simple message stating that the user's age is or is not verified. If the age authority 163 has determined that the consumer's age is in fact above a predefined threshold, then the server 102 sends a verification message 214 of the consumer's age to the user's device 120 via network 106. The unique machine-readable identifier or code of the user may be stored in the user record for the user.

In one alternative to step 310, the server 102 may compare any of the data 204 (that was sent to the server) to data located in the product record (in database 104) that corresponds to the product identifier in the data 204. If any of the data does not match, then there is a denial of validation and authentication. If all said data matches, then there is a validation and authentication that occurs. In one embodiment, the server 102 may also compare the counter value in data 204 to a running counter value located in the product record that corresponds to the product identifier in the data 204. If the counter value does not match, then there is a denial of validation and authentication. If the counter value matches, then there is a validation and authentication that occurs. In another embodiment, the server 102 may also compare the hash in data 204 to the result of a hash algorithm located in the product record that corresponds to the product identifier in the data 204. If the values do not match, then there is a denial of validation and authentication. If the values match, then there is a validation and authentication that occurs.

After the alternative to step 310, the server generates data and a URL containing the relevant consumer product information pulled from database 104 that is to be conveyed to the user 110 via the mobile device 120. This information may include the information previously disclosed to the user, as well as information regarding the authenticity of the product, warranty information, links to exclusive commercial content and loyalty programs sign-up pages, interactive content, and any other content relevant to the product and consumer. Then the server transmits said validation and data 206 to the reader over the communications network. The data 206 may include a URL, wherein a web page located at said URL includes the data pulled from database 104 and is configured for the user to interact therein. Data 206 may also include data indicating that said consumer product has passed or is otherwise compliant with regulatory review by the governmental authority. Next, the user engages with the mobile device 120 to access the URL and view the data 206 delivered to the device by server 102 over the communications network 106. Finally, the user may interact with the data in any manner permitted by the application, and in doing so may send additional requests 208 to the server 102 via the communications network 106. The server will then log the data in the request before generating the new data 210 and URL, as shown above. The server will then send the new data 210 and URL to the mobile device 120 for the user 110 to access and view, as described above.

It should be noted that before the consumer product 111 is purchased, the tags 121, 122 of the product may be scanned or read and the particular product 111 (as uniquely identified by the unique identifier) may be tracked and traced (and logged in database 104) during the process of manufacturing, importing, storing, distributing, and transporting said product to its final retail location before purchase. Specifically, said information may be logged in the product record corresponding to the unique identifier. When the product 111 is scanned or read by a user per the process of FIG. 3, said age verification of the user may be logged in database 104, thereby connecting or associating the tracking and tracing of the product before and after its sale. Specifically, said information may be logged in the product record corresponding to the unique identifier. The process above would be performed as follows: a mobile application on an RFID-capable computing device (similar to devices 120, 123) communicatively coupled to the network 106 is configured to read second identifying data from the RFID tag 122 and transmit ancillary data and said second identifying data to the server 102 via the network, wherein said ancillary data includes a date and a location, wherein the server 102 is configured for receiving said ancillary data and said second identifying data from the mobile application, accessing a first record in the database 104 that corresponds to the unique product identifier in the second identifying data, and storing the ancillary data in the first record.

It should be noted that when the consumer product 111 is purchased, the tags 121, 122 of the product may be scanned or read and the purchase of the particular product 111 (as uniquely identified by the unique identifier) may be logged in database 104 at the point of sale. Specifically, said information may be logged in the product record corresponding to the unique identifier. Later, when the product 111 is scanned or read by the user per the process of FIG. 3, said age verification of the user may be logged in database 104, thereby connecting or associating the sale of the product with the user. Specifically, said information may be logged in the product record corresponding to the unique identifier. The process above would be performed as follows: a mobile application on an NFC-capable point-of-sale computing device (similar to devices 120, 123) communicatively coupled to the network 106, wherein said mobile application is configured to read first identifying data from the NFC tag 121 and transmit sales data and said first identifying data to the server 102 via the network 106, wherein said sales data includes a date, a location and a sales amount, wherein the server is configured for receiving said sales data and said first identifying data from the mobile application, accessing a first record in the database 104 that corresponds to the unique product identifier in the first identifying data, and storing the sales data in the first record.

Additional functionality of server 102 is provided as follows. Once a consumer has navigated to the appropriate URL (see the processes described above), the consumer 110 may author and post comments, reviews, or pairing suggestions about the consumer product 111. Additionally, the consumer 110 may engage in an online chat, and interact with, a manufacturer, a store, a retailer, distributor, other end users, etc. Also, the consumer 110 may engage in an online chat, and interact with, a brand or company regarding questions, complaints, etc. about the consumer product 111. In another embodiment, the server 102 may confirm when a sale of a consumer product 111 occurs (at a retailer, for example) and send confirmation of said sale to the brand, retailer, distributor, etc. in real time. Further, the server 102 may provide to retailers, distributors, etc. with certain online training tools, such as webinars, talks and courses that provide training regarding how to sell the consumer product 111 to end-consumers. Moreover, the mobile application is further configured to read from the tags 121, 122 the temperature and humidity at which the consumer product has been situated during shipping and storage. Additional example processes are further described below with reference to FIGS. 3B and 3C.

Regarding the pairing functionality, once a consumer has navigated to the appropriate URL (see the processes described above), the consumer 110 may author and post comments and reviews about pairings for the consumer product 111. For example, if the consumer product were a wine, the consumer may author and post comments and reviews about food, and cigar pairings for the wine. In another example, if the consumer product were a cigar, the consumer may author and post comments and reviews about food/meal, and wine pairings for the cigar. In another example, if the consumer product were a liquor, the consumer may author and post comments and reviews about food/meal, and cigar pairings for the liquor. In one embodiment, an algorithm executing on the server 102 may suggest pairings for the consumer product 111. In one embodiment, the server 102 may include a communications module that puts the user 110 in contact with an expert that suggests pairings for the consumer product 111. For example, if the consumer product were a wine, the expert may be a sommelier. In another example, if the consumer product were a cigar, the expert may be a cigar aficionado. In another example, if the consumer product were a liquor, the expert may be a liquor expert.

Additional functionality of server 102 may include providing nearby smoking locations. Once a consumer has navigated to the appropriate URL (see the processes described above), the server 102 may suggest a nearby smoking location based on the current location of the user 110. If the consumer product were a cigar, the consumer would benefit from having quick and easy access to a smoking location. The server 102 receives the current location of the user 110 (as described more fully herein) and calculates the closest smoking location to the user's location, and subsequently displays this information to the user so that he may enjoy his cigar at said location. The server 102 may come up with a plurality of smoking locations within a preset distance from the user 110. In this case, the server 102 may filter the smoking location results by distance, type of establishment, etc. Once the consumer has navigated to the appropriate URL (see the processes described above), the consumer 110 may author and post comments and reviews about the smoking location(s) he utilized, so that other consumers may benefit from his review.

Figure 2B:
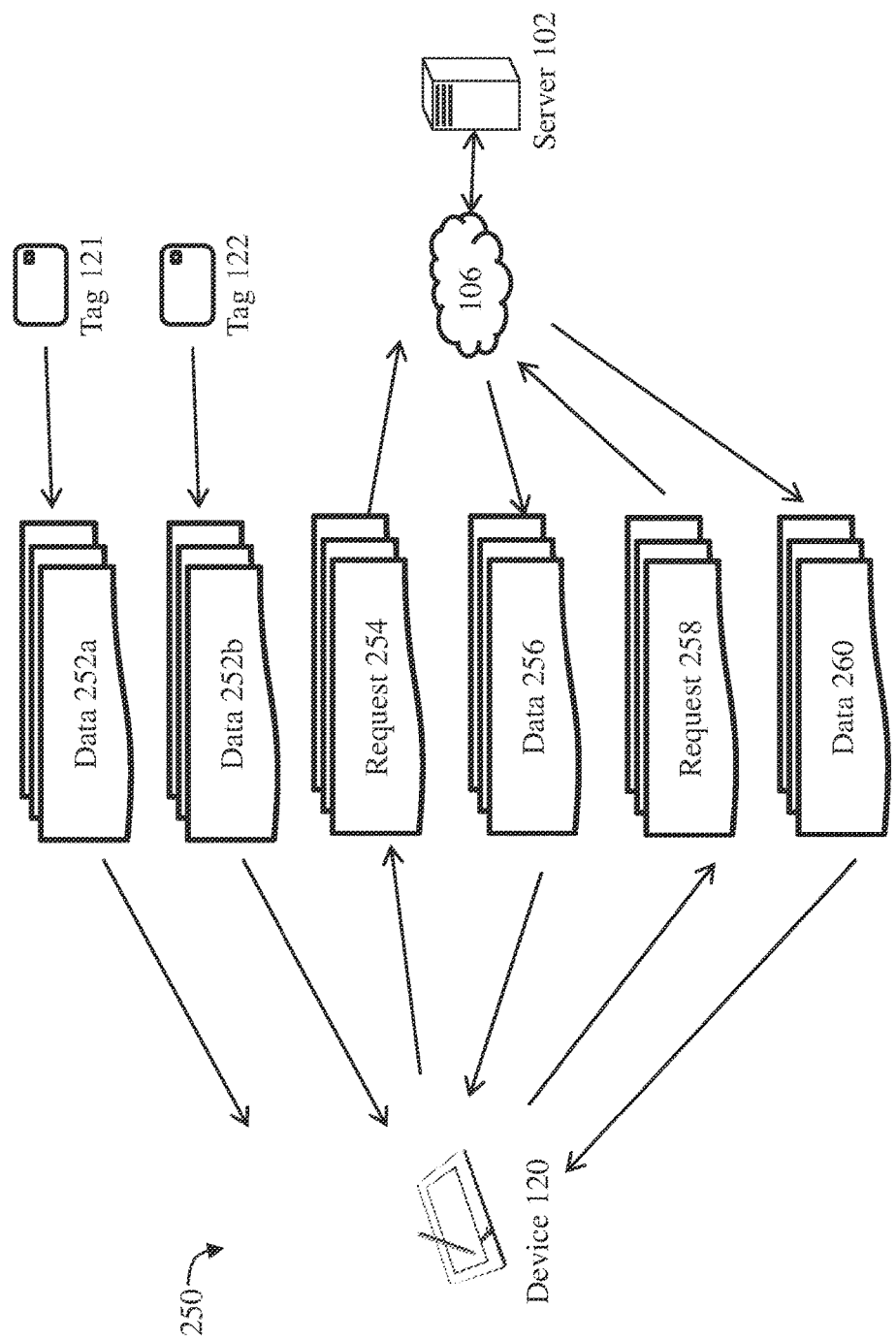
FIG. 2B is a diagram showing the data flow of a process for facilitating the dissemination of commercial content about a variety of consumer products, according to an example embodiment.
Figure 3B:
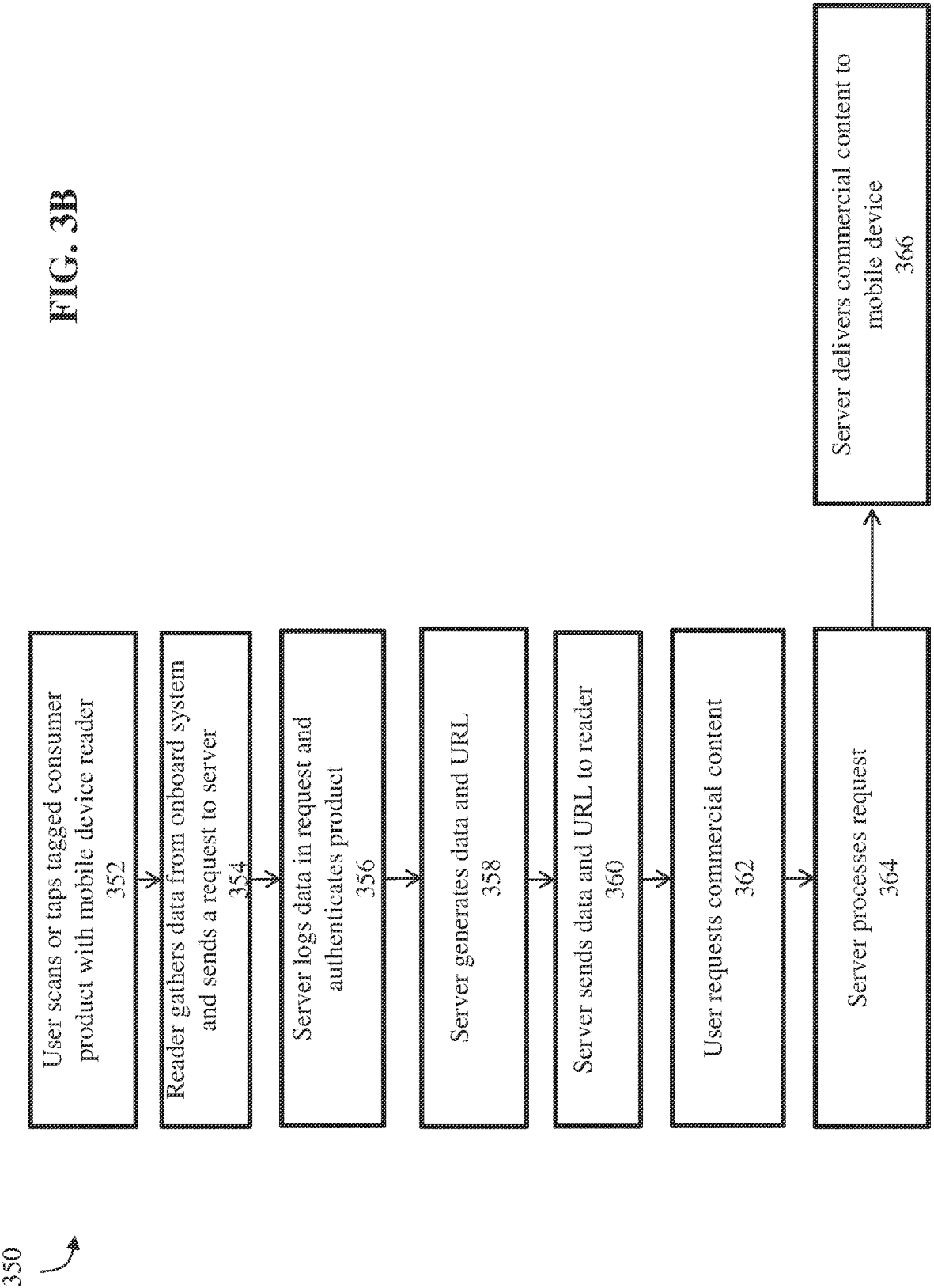
FIG. 3B is a flow chart of a method for disseminating commercial content about a variety of consumer products, according to an example embodiment.
Figure 5B:
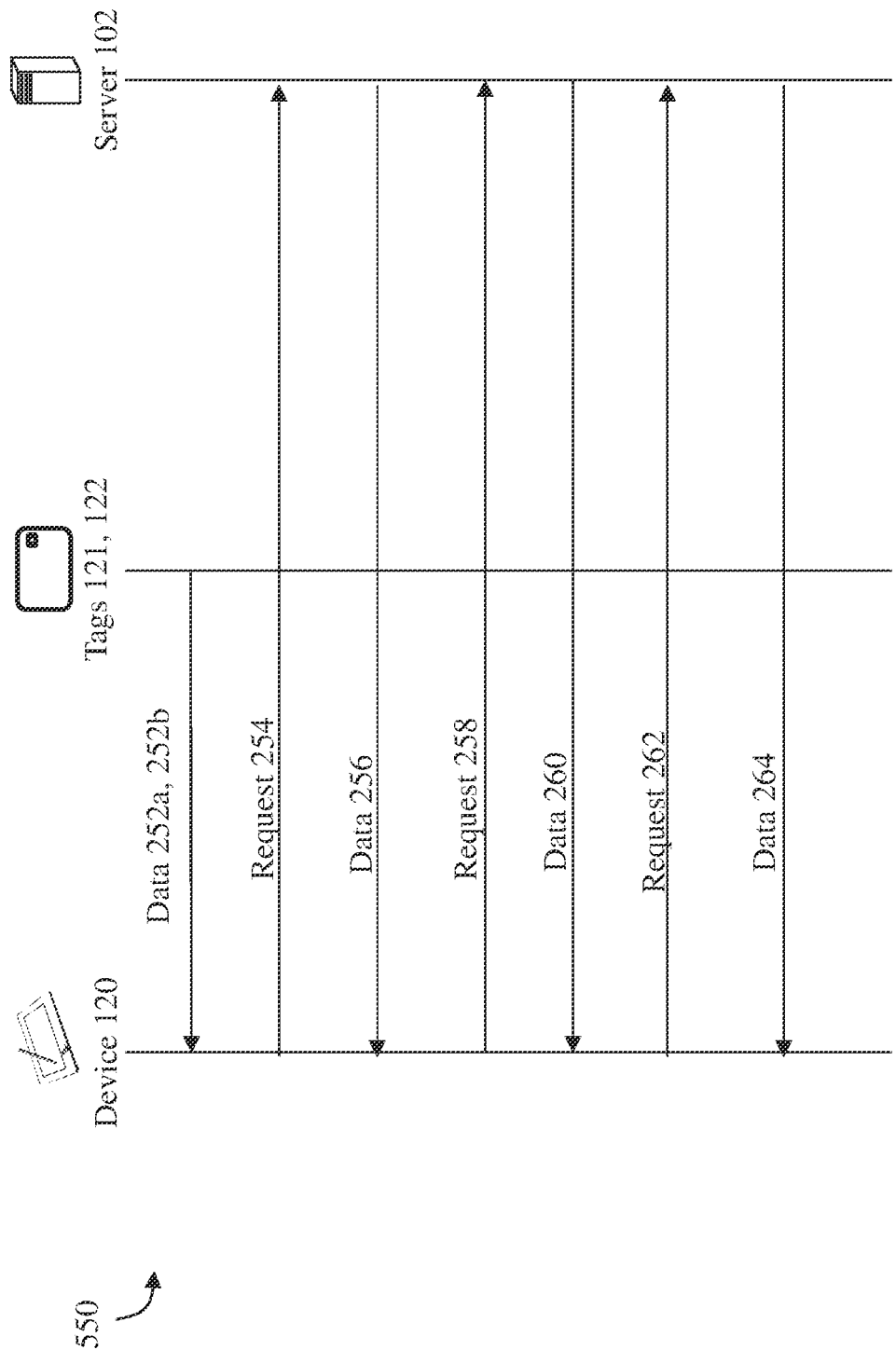
FIG. 5B is a diagram showing the interaction between a tag on a consumer product, a consumer mobile device, and a server during the process for facilitating the dissemination of commercial content about a variety of consumer products, according to an example embodiment.

The method and system for providing commercial content such as webinars, videos, interactive virtual reality experiences, etc. is described in more detail below, with reference to FIGS. 2B, 3B and 5B. FIG. 2B is a diagram showing the data flow 250 of the process for facilitating the provision of commercial content regarding a variety of consumer products. FIG. 3B is a flow chart 350 of a method for the provision of commercial content regarding a variety of consumer products, and FIG. 5B is a diagram 550 showing the interaction between tags on a consumer product, a consumer mobile device, and a server during the provision of commercial content regarding a variety of consumer products.

The method and system for providing commercial content begins with step 352 (see FIG. 3B), wherein the user 110 taps or scans the tags 121, 122 on a consumer product 111 using device 120. Once the user has scanned or tapped the tagged consumer product, as shown in step 352, the reader gathers data 252a, 252b (see FIG. 2B) from the onboard system and sends a request 254 to the server. Once the server logs the data in the request and authenticates the product in step 356, the server generates data and a URL in step 358 and sends said data and URL 256 to the reader in step 360.

The URL may contain any such commercial content as a manufacturer, retailer, brand, etc. may want to share with the end-user of their product. This may include information relating to upcoming events, infographics, websites, loyalty programs, blogs, videos, and any other commercial content deemed relevant to the related product. This may also include also include a link (such as a URL) for allowing the consumer to reorder said consumer product again online. After deciding which commercial content to engage with, a user sends a request 258 for the selected commercial content in step 362. The request is processed by the server in step 364 and the relevant commercial content data 260 is delivered to the user's mobile device in step 366. The commercial content data 260 may include one or more 3D files corresponding to the product identifier from the tag 121.

In one alternative to the steps above, the server may send one or more 3D files in the product record corresponding to the product identifier for said consumer product.

In one embodiment, the server is configured for detecting when the user's computing device is located in a location that prohibits certain commercial content from being displayed and thereby prohibits the transmission to the user's computing device, via the communications network, of said certain commercial content.

Figure 2C:
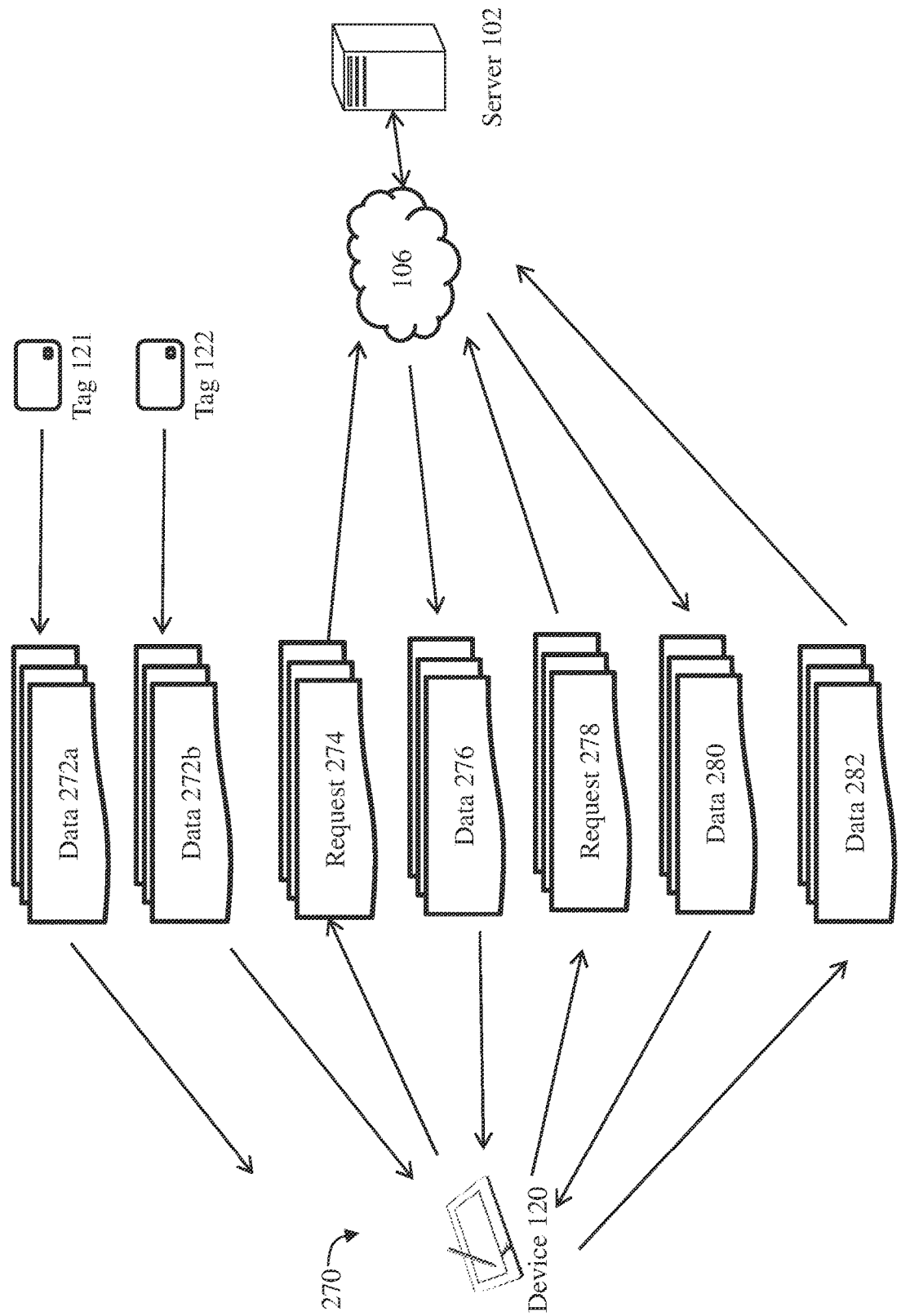
FIG. 2C is a diagram showing the data flow of the process for facilitating the administration of a consumer loyalty program for a variety of consumer products, according to an example embodiment.
Figure 3C:
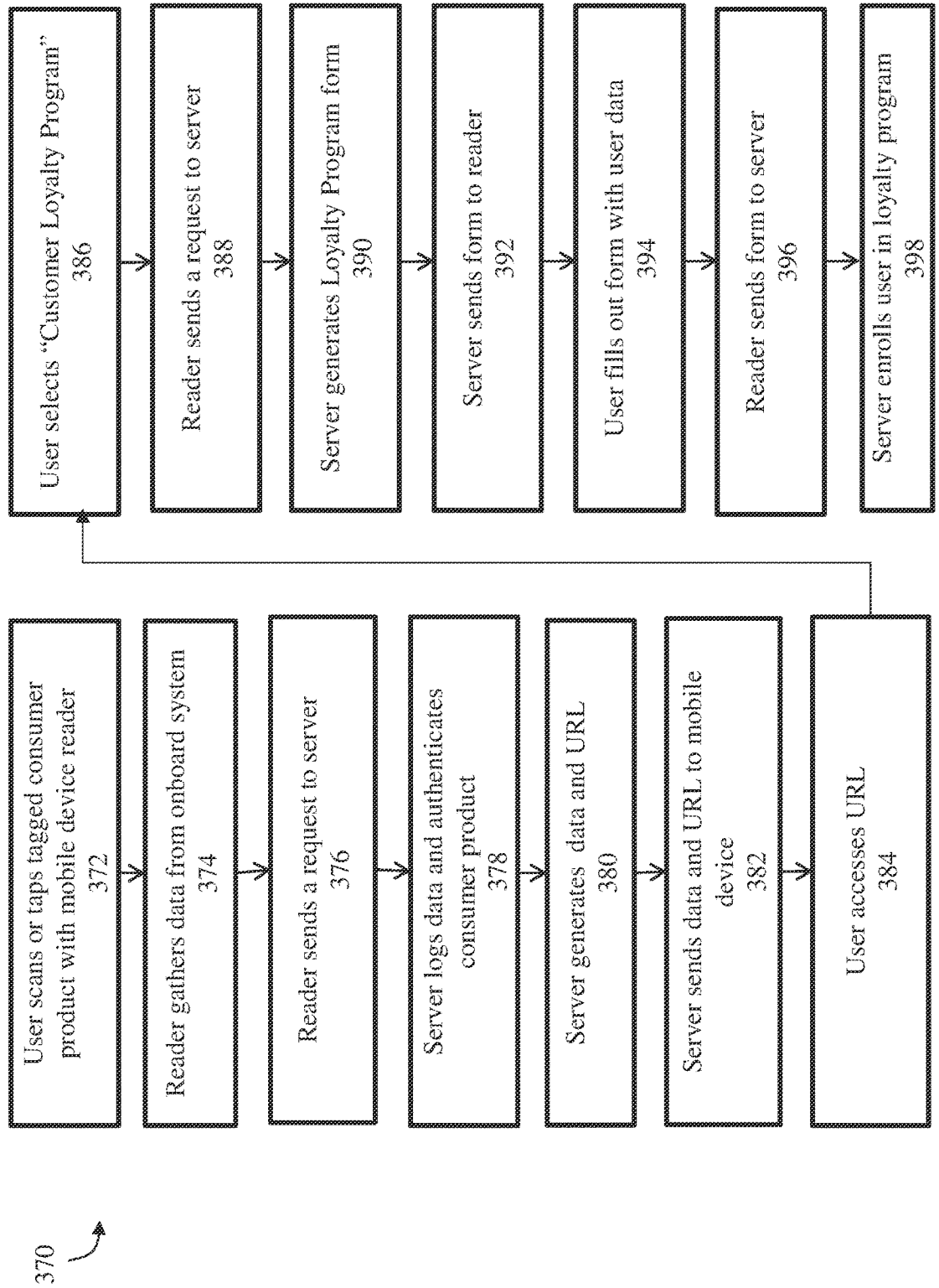
FIG. 3C is a flow chart of a method for administering a consumer loyalty program for a variety of consumer products, according to an example embodiment.
Figure 5C:
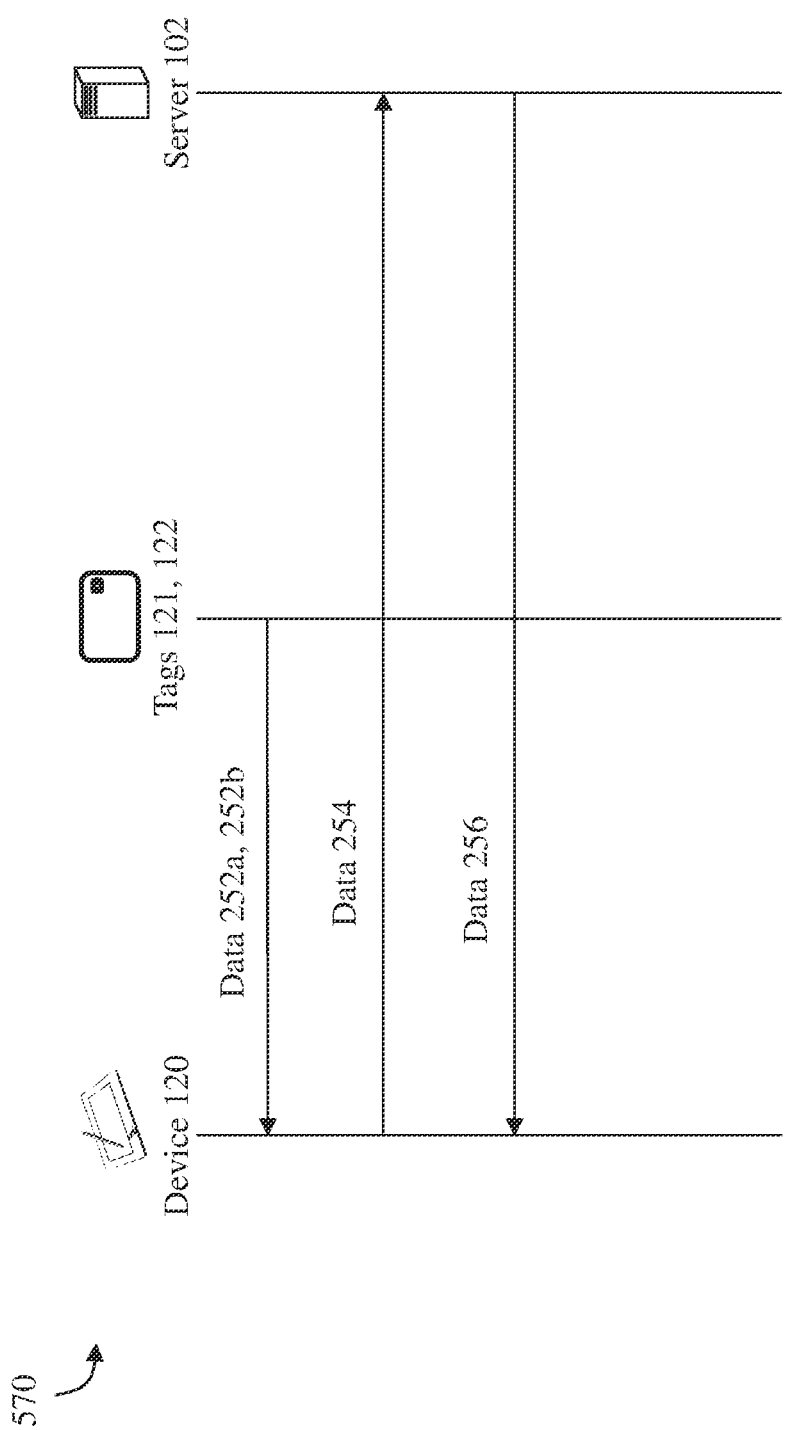
FIG. 5C is a diagram showing the interaction between a tag on a consumer product, a consumer mobile device, and a server during the process for facilitating the administration of a consumer loyalty program for a variety of consumer products, according to an example embodiment.

The method and system for enrolling and tracking progress in loyalty programs associated with the manufacturer or vendor of a consumer product is described in more detail below, with reference to FIGS. 2C, 3C and 5C. FIG. 2C is a diagram showing the data flow 270 of the process for facilitating the administration of a consumer loyalty program regarding a variety of consumer products, FIG. 3C is a flow chart 370 of a method for the administration of a consumer loyalty program regarding a variety of consumer products, and FIG. 5C is a diagram 570 showing the interaction between a tag on a consumer product, a consumer mobile device, and a server during the administration of a consumer loyalty program regarding a variety of consumer products.

The administration of a consumer loyalty program likewise begins with step 372 (see FIG. 3C), wherein the user 110 taps or scans the tags 121, 122 on a consumer product 111 using device 120. In step 374 the reader gathers data 272a, 272b from the onboard system and sends a request 274 to the server in step 376. The server then logs the data, authenticates the product, and generates data and a URL in steps 378, and 380, respectively. The data and URL generated by the server are sent to reader/mobile device in step 382 utilizing data packet 276, thereby allowing the user to access said data and URL as shown in step 384. As mentioned above, the data and displayed materials on the URL page may include information regarding customer loyalty programs, commercial content, FDA status, etc. In step 386 the user selects "Customer Loyalty Program." The term "Customer Loyalty Program" is used in this embodiment as an example of displayed text used to signal to a user that upon interact with said text, they will be taken through the steps of enrolling in a loyalty program associated with the scanned product. Other embodiments may include any such text that conveys substantially the same message, such as "Loyalty Program Sign-Up" or other similar options.

Once a user has selected "Customer Loyalty Program," the reader sends a request 278 to server 102 in step 388. Upon receiving said request, the server generates a loyalty program form and sends it to the reader in steps 390 and 392 respectively, utilizing data packet 280. The user then fills out the form with user data in step 394 and the reader returns the form to the server via data packet 282, in step 396. User data may include any such data requested by a loyalty program owner, including but not limited to name, address, demographic data, email address, phone number, etc. The server enrolls the user in the relevant loyalty program upon receipt of the loyalty program form in step 398.

Figure 7:
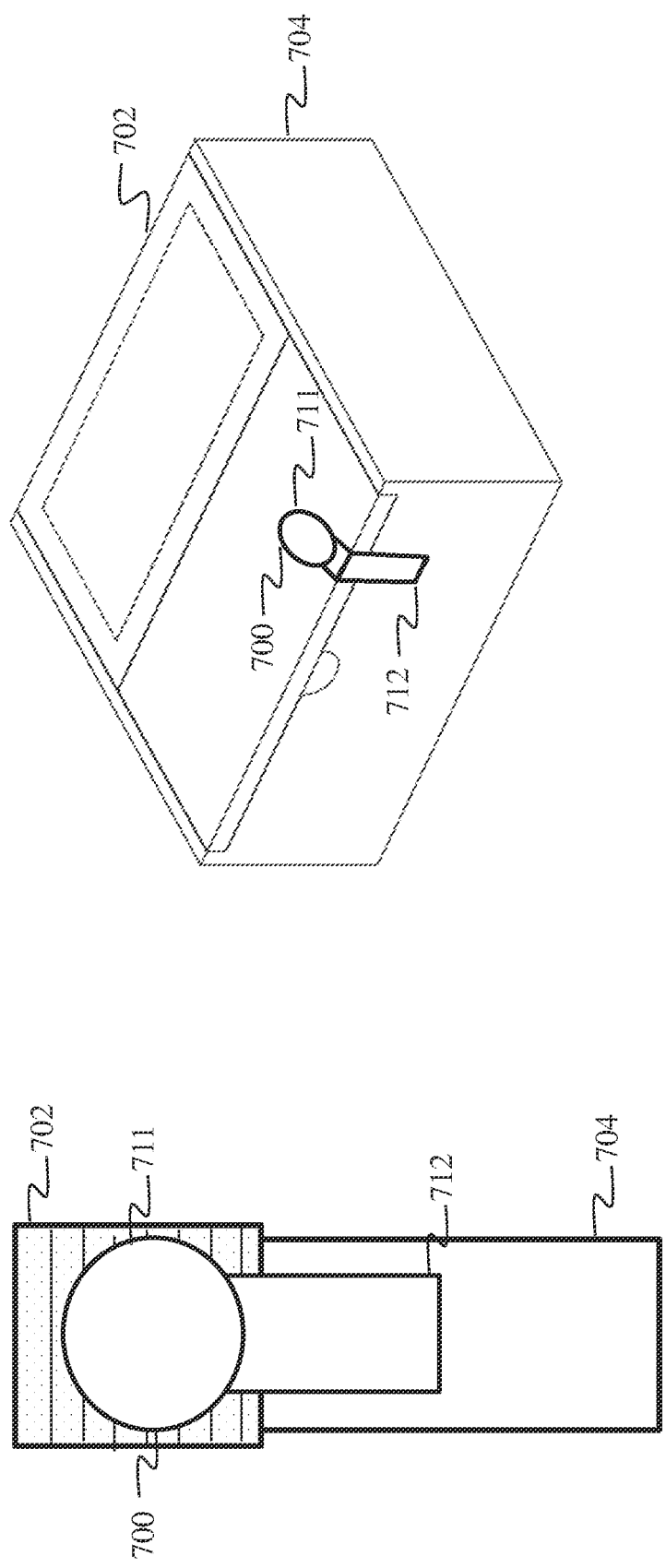
FIG. 7 presents two drawings depicting a tag on a consumer product, according to an example embodiment.

FIG. 7 presents two drawings depicting a tag 700 on a consumer product, according to an example embodiment. The left drawing in FIG. 7 shows the top of an alcoholic beverage bottle or container, which may be liquor, beer, wine, spirits, or any other beverage containing alcohol and located in a container. The container comprises a stationary reservoir 704 and a movable cap, plug or cork 702. The tag 700 comprises a main portion 711, which may have a round shape, wherein the main portion is attached to the movable cap, plug or cork 702, such as via adhesive. The tag 700 also comprises a lead portion 712, which may have a rectangular shape, wherein the lead portion is attached to the stationary reservoir 704, such as via adhesive. When the movable cap, plug or cork 702 is removed or otherwise moved by the consumer, the main portion 711 is detached from the lead portion 712, which cuts or otherwise alters conductive terminals or conductive lead lines in the tag 700. Said detachment is detectable by the tag 700, which is configured to record that the alcoholic beverage product has been opened.

The right drawing in FIG. 7 shows a cigar box. The cigar box comprises a stationary box 704 and a movable top 702. The tag 700 comprises a main portion 711 attached to the movable top 702, such as via adhesive. The tag 700 also comprises a lead portion 712 attached to the stationary box 704, such as via adhesive. When the movable top 702 is opened or otherwise moved by the consumer, the main portion 711 is detached from the lead portion 712, which cuts or otherwise alters conductive terminals or conductive lead lines in the tag 700. Said detachment is detectable by the tag 700, which is configured to record that the cigar box has been opened.

Figure 6:
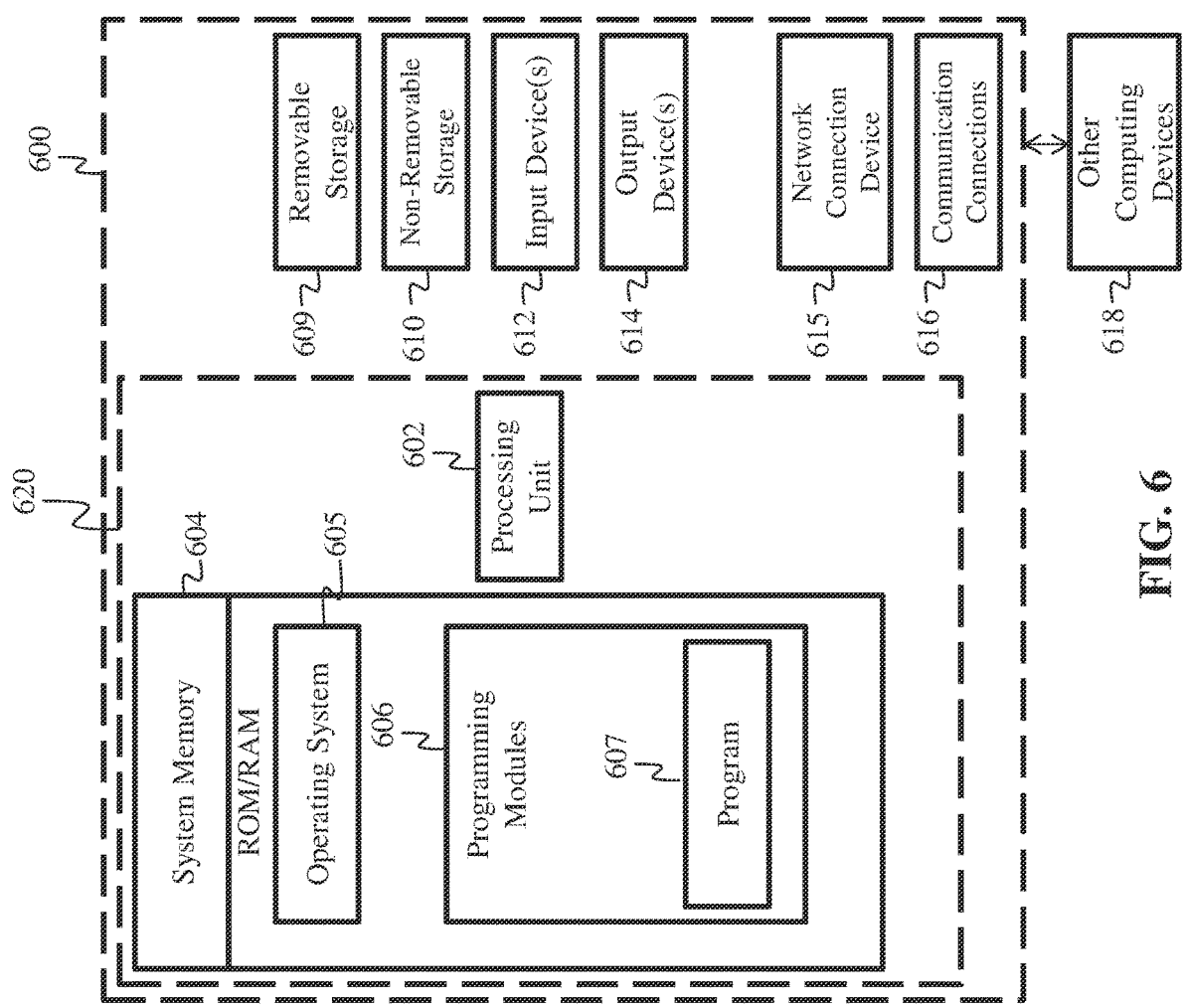
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by device 102 and devices 120, 123 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and processes 200, 250, 270, 300, 350, 370, as described above. Processes 200, 250, 270, 300, 350, 370 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g., random-access memory (RAM)), non-volatile (e.g., read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of device 102 and devices 120, 123. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable, and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology. CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter, or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g., program module 607) may perform processes including, for example, one or more of the stages of the processes 200, 250, 270, 300, 350, 370 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for confirming regulatory entity registration of a consumer product and verifying age of a user of the consumer product, the method comprising:

coupling a radio frequency tag to the consumer product wherein said tag is programmed to provide the following identifying data to a mobile computing device when said tag is scanned: a unique product identifier, and an encrypted packet comprising a hash that uniquely identifies said tag;

storing in a database, communicatively coupled to a communications network, a record for each of a plurality of consumer products, wherein each record includes: a unique product identifier, and a hash algorithm;

storing in a database, communicatively coupled to a communications network, a record for each of a plurality of consumers, wherein each record includes: a unique consumer identifier, and a date of birth;

executing an application on a computing device communicatively coupled to the communications network, wherein said application is configured for reading identifying data from the radio frequency tag and transmitting said identifying data to a server via the communications network;

wherein the server is configured for:
 i) receiving the identifying data from the application;
 ii) accessing a first record in the database that corresponds to the unique product identifier in the identifying data;
 iii) comparing the hash in the identifying data to a hash algorithm in the first record; and
 iv) if the hash in the identifying data matches the hash algorithm in the first record, then transmitting, over the communications network, a confirmation of regulatory entity registration of the consumer product to the application;

wherein said application is further configured for reading user identification data from the user and transmitting said user identification data to the server via the communications network;

wherein the server is further configured for:
 i) receiving said user identification data from the application;
 ii) calculating an age of the user based on the user identification data; and
 iii) if the age of the user is above a predefined age, then accessing a second record in the database that corresponds to the user and storing the user identification data in the second record, and a pointer to the first record.

2. The method of claim 1, wherein the application on the computing device is further configured for reading data from the radio frequency tag if said radio frequency tag provides an encrypted data packet to said application, wherein said application contains a key for unencrypting said data packet.

3. The method of claim 2, further comprising:

executing a second application on a second computing device, wherein said second application is configured for reading identifying data from the tag and transmitting said identifying data to the server via the communications network; and wherein the server is further configured for:
 i) receiving the identifying data from the application;
 ii) accessing the first record in the database that corresponds to the unique product identifier in the identifying data;

iii) comparing the hash in the identifying data to a hash algorithm in the first record; and iv) if the hash in the identifying data matches the hash algorithm in the first record, then transmitting, over the communications network, an approval of authentication of the consumer product to the second application.

4. The method of claim 3, wherein the server is further configured for:

transmitting to the second application, via the communications network, exclusive commercial content relating to the consumer product, including audio, video, and augmented reality media; and transmitting to the second application, via the communications network, information about joining a consumer loyalty program.

5. The method of claim 4, wherein the server is further configured for:

transmitting to the second application, via the communications network, a nearby smoking location for the consumer product.

6. The method of claim 5, wherein the server is further configured for:

transmitting to the second application, via the communications network, content relating to a location and/or language of the second computing device.

7. The method of claim 6, wherein the server is further configured for:

detecting when the second computing device is located in a location that prohibits certain commercial content from being displayed;

prohibiting the transmission to the second application, via the communications network, of said certain commercial content.

8. The method of claim 7, wherein the server is further configured for:

accessing a 3D file in the database that corresponds to said consumer product, wherein said 3D file corresponds to the first record of the consumer product; and transmitting, by the server to the mobile application, over the communications network, the 3D file.

9. The method of claim 8, wherein the radio frequency tag further comprises a main portion adhered to a stationary portion of the consumer product, and a lead portion adhered to a movable portion of the consumer product, wherein when the movable portion is moved, the lead portion is detached from the main portion, and the radio frequency tag is configured to record that the consumer product has been opened; and wherein the radio frequency tag is further programmed to provide the following identifying data to the second mobile computing device when said radio frequency tag is scanned: a value that indicates whether the consumer product has been opened; and wherein the server is further configured for storing said identifying data in the database in association with the first record.

10. The method of claim 9, further comprising:

executing a third application on a third mobile computing device communicatively coupled to the communications network, wherein said third application is configured to read identifying data from the radio frequency tag and transmit ancillary data and said identifying data to the server via the communications network, wherein said ancillary data includes a date and a location; and wherein the server is further configured for receiving said ancillary data and said identifying data from the third application, accessing the first record in the database that corresponds to the unique product identifier in the identifying data, and storing the ancillary data in the first record.

11. The method of claim 10, wherein the radio frequency tag is further programmed to include the following information in the identifying data: a log of temperature and humidity data regarding shipment and storage of the consumer product; and wherein the server is further configured for receiving and storing the log of temperature and humidity data regarding shipment and storage of the consumer product in the first record.

12. The method of claim 11, wherein the server is further configured for:

transmitting to the second application, via the communications network, a link for reordering the consumer product online.

13. The method of claim 12, wherein said radio frequency tag is either a radio frequency identification (RFID) tag or a near field communication (NFC) tag or both.

14. The method of claim 13, wherein the server is further configured to collect one or more of the following data when a consumer product and/or consumer is scanned:

product location and supply behavior;

consumer habits;

sales information;

real time transparency and reporting of regulatory entity user fees by manufacturer/importer per product category;

regulatory entity manufacturing facility inspections;

regulatory entity compliance check inspections of product retailers;

regulatory entity good manufacturing processes inspections; and inter-agency data sharing.

* * * * *